United States Patent Office 3,681,320
Patented Aug. 1, 1972

3,681,320
PREPARATION OF DISAZO J ACID UREA
DYESTUFFS
Richard C. Franklin, Wilmington, Del., assignor to E. I.
du Pont de Nemours and Company, Wilmington, Del.
No Drawing. Filed Jan. 13, 1970, Ser. No. 2,650
Int. Cl. C09b 33/02
U.S. Cl. 260—175
3 Claims

ABSTRACT OF THE DISCLOSURE

Preparation of storage-stable aqueous solutions containing 10–25 weight percent of a disazo J acid urea dye by coupling an aryl diazonium salt, for example, a salt from Broenner's acid, and J acid urea, at a molar ratio of about 2:1, in an aqueous medium, at a pH of about 3–9, at a temperature of about 0–65° C., in the presence of triethanolamine as the acid acceptor.

BACKGROUND OF THE INVENTION

(1) Field of the invention

This invention relates to the preparation of stable aqueous solutions of disazo J acid urea dyes.

(2) Description of the prior art

Disazo dyes obtained by coupling aryl amines and derivatives thereof to J acid urea (6,6'-ureylenebis-1-naphthol-3-sulfonic acid) are well known, as evidenced by German Patent 122,904 granted Nov. 16, 1899. A more recent example of the prior art relative to such dyes is U.S. Patent 2,746,955 issued May 22, 1956 to Armento. Another disazo J acid urea dye, Colour Index Direct Red C.I. 29,220, is derived from J acid urea and 2-naphthylamine-5-sulfonic acid. Prior art preparations of the aforesaid type of dye usually involve isolation in the form of the sodium salt or as the free acid. The coupling reaction mixtures in which such dyes are prepared contain only about 3–7% of the dye. The dyes, after isolation as a dry powder, are widely used for dyeing cellulosic materials, including cotton and paper, but especially the latter. To be useful for dyeing paper, the dyes must be reasonably soluble in water, substantive to paper, and bleedproof when the dyed paper is wet. Prior art dyes of the above type usually are sold as dry powders having 20–80 weight percent active ingredient. Use of such powders in conventional processes often is objectionable because of dusting problems which make the dyes difficult to handle and weigh and which may result in undesirable staining because of drifting of the powder. Moreover, dissolution of such powders may be difficult, especially in cold beater applications during winter months when the temperature of the water approaches the freezing point. Low solubilities may cause pumping and metering problems, thus adversely influencing the controllability of the dyeing process, as well as inducing specking problems.

Modern methods for dyeing textiles and paper have caused demand for dyes in liquid form. In many cases the liquid dyes can be measured and handled more efficiently in the dyeing operation than the corresponding powder dyes. While many such dyes used in the trade, including most of those containing carboxylic or sulfonic acid groups, are commonly referred to as soluble, this solubility is usually only of the order of 1–5% in water, which is sufficient to be useful in the dyeing operation itself but not large enough to allow commercially economical shipping and storage of the solutions. Most fluid dyes now commercially available attain a preferred 10–25% solubility through the use of an organic water-miscible solvent, such as glycerine, glycol ethers, alcohols and the like. Forming compositions of this sort may require isolation of the free acid form of dyes containing acidic groups, which often poses new problems. Compositions containing gross amounts of organic solvents may also offer hazards due to flammability and/or objectionable odors.

Improvement in the solubility of anthraquinone sulfonic acid dyes by forming salts with monoethanolamine, diethanolamine, triethanolamine and other similar compounds is disclosed in U.S. Patent 2,314,356. These salts are said to be two to five times as soluble in water as the corresponding sodium salt. This patent is devoted entirely to anthraquinone sulfonic acids and does not involve disazo J acid urea dyestuffs.

OBJECTS AND SUMMARY OF THE INVENTION

It is an object of the present invention to provide stable, uniform, aqueous solutions of disazo J acid urea dyestuffs. It is a further object to provide such dye solutions of suitable dye concentration, 10–25 weight percent active ingredient, so that they can be employed in conventional cellulosic dyeing processes, thus avoiding the problems of handling the dyes as dry powders. Another object is to provide such dye solutions which can be pumped and measured volumetrically during the dyeing process. Still another object is to provide a process of preparation of such dye solutions. A further object is to provide such a process of preparation that permits the reaction mixture to be standardized in the reaction vessel and thereafter directly packaged for sale and use, thus eliminating isolation, purification and treatment of the disazo J acid urea dye product.

The objects of the invention are achieved by means of a process for coupling aryl diazonium compounds to J acid urea in an aqueous medium, the process comprising coupling the diazonium compound and the J-acid urea in the presence of triethanolamine as the acid acceptor.

DESCRIPTION OF THE INVENTION

The present invention resides in the discovery that when an aryl diazonium salt is coupled to J acid urea in an aqueous solution at a pH of 3–9, at a temperature of 0–65° C., in the presence of triethanolamine, the reaction product is a stable aqueous dye solution comprised of 10–25 weight percent of active dye ingredient, that is, the coupled dye product, substantially as the triethanolamine salt, thus permitting direct use of the reaction mixture in conventional cellulosic dyeing processes.

Azo dyes are normally made by diazotizing an amine to form a diazonium salt, then reacting the salt with a coupler, usually an aromatic hydroxy or amino compound. Couplings are made either in acid or alkaline media, as suits the individual case; however, in general, couplings proceed more rapidly in alkaline media. The process of the present invention is applicable to aqueous couplings where the pH is adjusted to 3–9 by adding triethanolamine to serve as acid acceptor during the coupling reaction.

In order to achieve the minimum desirable dye concentration of 10% in solution it is necessary to provide at least one sulfonic or carboxylic salt forming site on each dye molecule in addition to the two sulfonic acid groups provided by J acid urea. Therefore, at least one molar equivalent of sulfonic or carboxylic acid group, but preferably two, must be furnished as part of the amines employed in preparing the diazonium salts to be coupled with one mole of J acid urea. As exemplified in Example 8 herein where one mole of aniline and one mole of sulfanilic acid are diazotized and coupled, per mole of J acid urea, the resulting product remained a clear solution for only several days and was thus less desirable for commercial use then the more stable solution products. However, since incorporation for diazotization of molar or less than molar amounts (even as low as 0.1 mole per mole of J acid urea) of amine containing no acid groups leads to the formation of dyes having improved brightness, strength or other properties, such incorporation is included in the process of this invention. Incorporation of such amines can also be employed to effect shade variations.

Among the amines useful for coupling to J acid urea in the process of this invention are 6-amino-2-naphthalenesulfonic acid, 2(or 5)-amino-1-naphthalenesulfonic acid, 5-amino-2-naphthalenesulfonic acid, 8-amino-2-naphthalenesulfonic acid, 8-amino-1-naphthalenesulfonic acid, 2,4-xylidine-1-sulfonic acid, 2-aminotoluene-5-sulfonic acid, sulfanilic acid, p-aminobenzoic acid, aniline, o-anisidine and o-toluidine. These amines, when diazotized and coupled to J acid urea according to the process of the invention, yield final reaction masses which, after adjusting to the desired strength, are true solutions. The solutions obtained when the preferred combinations of amines are used (exemplified by Examples 1–7 herein) have excellent stability and can be stored and shipped for commercial use. Less favored amine combinations (exemplified by Example 8) give products lacking the same stability; nevertheless, these products are valuable where they can be used without long delay.

Conventional methods of diazotization can be used. These methods are well known and are described in "Synthetic Dyes" by Venkataraman, vol. I, pages 210–214, published in 1952 by Academic Press, Inc., New York. The starting amine compound, if it contains a sulfonic acid or carboxylic acid group, can be in the form of the free acid or a salt thereof, but preferably it is in the form of the free acid.

While diazotization can be carried out as in the usual prior art methods, several restrictions are desirable in order to obtain the maximum benefits of the invention: (1) The amine used for diazotization should be in relatively pure form and should not contain excessive contaminating acid or inorganic salts such as sodium chloride or sodium sulfate. (2) The volume of the diazotization reaction mass should be kept to a practical minimum, not only for reasons of economy but also to insure that the final product solution will be of required strength and not overly dilute. The same restrictions, of course, apply to the J acid urea to which the diazotized amines are coupled. It should be in as pure a form as possible, and the volume of the coupling slurry should be carefully controlled to avoid overdilution with resultant low strength of the final reaction mass. It has been noted that while either or both diazo salt slurry and J acid urea slurry can be rather thick under the process conditions, the reaction mass rapidly thins out as reaction proceeds to give the thin liquid final product.

Since prior steps in the synthesis of both diazotizable amines and couplers such as J acid urea usually produce sodium chloride or sodium sulfate along with the desired organic compounds, such salts are nearly always present in the final reaction mass after the coupling step. Steps can be taken to minimize the effect of these byproducts by procedures such as isolation of the insoluble diazonium salt by filtration before coupling, the major part of the soluble salt being removed with the filtrate; however, this or other known salt removing procedures imposes a sizable economic penalty. Direct packing and shipping of reaction mass products has hitherto been precluded not only by the inherently limited solubility of the normally produced sodium salt but also by the salting out effect of the sodium chloride or sulfate derived both from the coupling reaction itself and already present in the intermediates. The process of the invention, using triethanolamine as acid acceptor and salt forming base; confers a tolerance for sodium chloride and sulfate sufficient to provide solutions of commercial strength despite the presence of these salts. This tolerance is not unlimited, however, and the salt content derived from the amine used for diazotization and the J acid urea must be kept as low as possible, not above about 30% and preferably not above 5% of the combined weight of amine and J acid urea, to insure operability of the process and stability of the dye solution product. Even where the amount of salt entering the final reaction mass is at the upper limit, the contrast between the process of the invention and prior art processes is striking. For example, use of the same intermediates and reaction volume employed in the instant process but substituting soda caustic or soda ash for triethanolamine gives coupling mixtures that are thick and unworkable.

The coupling compound J acid urea, that is, 6,6'-ureylenebis-1-naphthol-3-sulfonic acid, offers at least two coupling sites on each molecule. It can thus be coupled with one, two or even more diazonium salts to give dyes varying in shade and other properties.

In operating the process of the invention, the diazotization reaction can be carried out in a known manner. Normally, after the diazotization reaction is complete, the diazonium salt reaction mass consists of an acid aqueous slurry held at a fairly low temperature of 0–20° C. In a second vessel, an aqueous slurry or solution of the coupler is prepared, the volume being carefully controlled to assure a final reaction mass product of adequate strength. If the coupler is not all in solution, the mass must be agitated until a smooth, non-lumpy slurry is achieved. Temperature is adjusted as desired. Coupling of diazonium salts with J acid urea can be performed under a fairly wide range of temperature and pH conditions. The preferred temperature for the coupling reaction is about 45° C. At this temperature the coupling proceeds rapidly, and the diazo solution or slurry can be added to the coupler over a period of about 20 minutes to an hour without significant decomposition of the diazonium salt, thus providing a product of satisfactory purity. At temperatures much above 65° C. there is danger of excessive decomposition, particularly if agitation is not extremely efficient. At lower temperatures, for example, approaching 0° C., the coupling mass tends to be thicker and cannot always be stirred with the proper efficiency.

The useful range of pH is about 3–9. In the simplest method of operation, the required amount of triethanolamine is added to the coupler before any diazo addition is made, bringing the pH in the coupler vessel to 8.0–9.0. The total amount of diazo is then gradually added at a rate such that it reacts immediately with the coupler and has no opportunity for decomposition in the coupling vessel. Final pH of the product solution is 7.5–8.0, and more triethanolamine is added to maintain the pH at this level, if necessary. In a variation of this coupling procedure, a fraction, such as one half, of the total amount of diazonium salt is added to the coupler maintained at a lower pH, such as 4.0–5.0, by co-addition of triethanolamine. The pH is then raised to the 8.0–9.0 level by adding more triethanolamine, and the remainder of the diazonium salt is gradually added, maintaining pH at 7.5–8.0 by adding triethanolamine as necessary. There should be no free diazo in the coupling reaction at any time, addition of diazonium salt being slowed if there is any indication of diazo presence. A little water is usually used to wash the residual diazo slurry from the first vessel into the final reaction mass. The final mass is normally a thin liquid free of suspended solids. It is held on temperature for about ½ hour to ensure completeness of reaction. A test is made by spotting the diluted reaction mass on a white filter paper and allowing the liquid bleed to contact a similarly spotted bleed from a tetrazotized dianisidine solution. A light color is seen, and it does not completely disappear. A heavy color indicates incompleteness of reaction and may require the addition of more diazo to react with the coupler completely.

The finished solution is cooled to 20–30° C., and the strength is adjusted as desired by adding water.

Permissible variations in the coupling procedure include the following:

(1) Diazotize one amine and couple at one temperature and pH condition.
(2) Diazotize one amine and couple at more than one temperature and pH condition.
(3) Diazotize two or more amines mixed before diazotizing and couple at one temperature and pH condition.
(4) Diazotize two or more amines mixed before diazotization and couple at more than one temperature and pH condition.
(5) Diazotize two or more amines separately but couple consecutively at the same temperature and pH condition.
(6) Diazotize two or more amines separately and couple consecutively at different temperature and pH conditions.

These variations have an effect on the shade and other qualities of the dye solution produced and are used to meet specific requirements of dye users. The variations are illustrated in the examples included herein.

Small amounts of sodium formate, sodium acetate or other buffering compounds can be used in the couplings to assist in maintaining a pH range of 3.0–5.0.

The J acid urea dyes which have large molecular weights, such as 800–1000, can be produced as 10–20% solutions by the above process. This strength is adequate for commercial use, offering about 30–50% of the strength of powdered dyes customarily sold for the same application.

The advantages attained by the process of the invention require that triethanolamine be present during the diazo coupling reaction to neutralize the acid liberated when the diazonium salt reacts, and to form the more soluble triethanolamine salts of the sulfonic or carboxylic acid groups on the dye molecule. Isolation of the dye in its acid form, free of inorganic salts, with subsequent neutralization with triethanolamine will give suitable dye solutions, but at considerably economic penalty.

It should be realized that in commercial production there will be substantial amounts of sodium (or sometimes potassium) ions present in the solution product. Where sodium or potassium is present in the amine sulfonic acid or carboxylic acid compound, it persists into the final solution. Any free sulfonic or carboxylic acid groups will be neutralized by triethanolamine, and may HCl or $H_2SO_4$ liberated during the coupling action will also be neutralized by triethanolamine. The major cation present is, therefore the triethanolammonium ion. The formulas shown in the examples herein reflect this condition; however, there are undoubtedly some dye molecules present in the form of sodium salts.

The preferred dye solutions of the invention have maintained their clarity and homogeneity for periods longer than six months in controlled tests. Storage temperatures of 50° C. or higher tend to accelerate the eventual precipitation of the dyes. Dye solutions prepared from less favored amine combinations have intermediate stability, and their use must be planned with this in mind.

The dye solutions of the invention are useful directly in dyeing cellulosic materials, including cotton, but especially paper. The properties of light and wet fastness, substantivity and bleed fastness are acceptable in the trade and the dyes can be used wherever the similar powdered forms of the dyes are used. When used to dye cotton, the resultant shade is similar to that obtained on paper. The dye solutions of the invention are particularly useful in the continuous dyeing of paper where the ease of handling and metering offers definite advantages over the older powder types. The dye solution can be metered directly into the paper pulp slurry at a point after the last refiners in the system. This procedure eliminates the color contamination of beater chest, machine chest and other equipment which normally occurs in batch dyeing where dye is usually added at an earlier point in the process. Control of shade is rapid and efficient, and changes of shade can be made quickly because only a small part of the system is occupied by color or colored fibers.

The invention is illustrated in the following examples which are not meant to be limiting. In the example descriptions, hydrochloric acid is 31% aqueous solution and sodium nitrite is 31.5% aqueous solution, unless otherwise noted. The figures given are based on 100% HCl and $NaNO_2$. The couplings are carried out using 50.4 parts of J acid urea (0.1 mole) and a slight molecular excess of the amine compounds from which the diazonium salts are prepared, two moles of diazonium salt being coupled with one mole of J acid urea. Cooling is by external means, no ice being added to the reaction mixture. Parts are by weight. The J acid urea in all the examples was used in the form of a presscake containing about 40 parts of J acid urea and about 60 parts of water with some sodium chloride contaminant. The figures given denote actual J acid urea, not the amount of presscake.

The formulas show all sulfonic and carboxylic acid groups as neutralized by triethanolammonium ions; however, some are undoubtedly in the form of sodium or potassium salts.

EXAMPLE 1

In a first vessel 45.8 parts of 6-naphthylamine-2-sulfonic acid (Broenner's Acid) and 11.7 parts of hydrochloric acid were added to 120 parts of water, with agitation. To this slurry were gradually added 14.5 parts of sodium nitrite and the mixture was stirred for 3 hours to complete diazotization, the temperature being maintained throughout at 20° C. by external cooling. In a second vessel 50.4 parts of J acid urea in the form of a water wet presscake were added to 100 parts of water and the mixture stirred to a uniform slurry. Then 51.0 parts of triethanolamine were added and the slurry was heated to 45° C. The diazo slurry from the first vessel was then added to the J acid urea slurry in the second vessel over a 15 to 20 minute period, maintaining a temperature of 45° C. in the second, or coupling, vessel. The final pH of the solution was 7.9. This reaction mass was a dark red solution having an active ingredient content of about 17% as measured spectrophotometrically against a known standard. It was completely miscible with water and dyed paper by conventional methods in a bright scarlet shade.

The dye of this example is predominantly

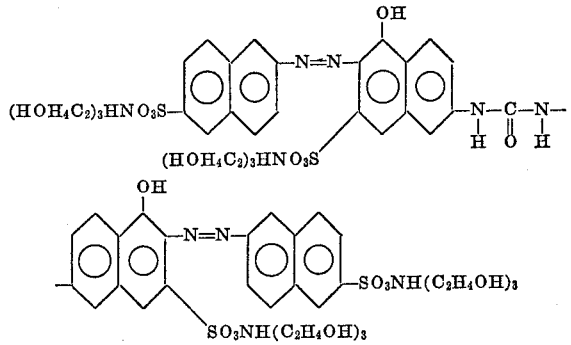

although some of the sulfonic acid groups are in the form of sodium salts.

EXAMPLE 2

In a first vessel 50.4 parts of J acid urea in the form of water wet presscake and 4.1 parts of sodium acetate were added to 150 parts of water and stirred to a uniform slurry. In a second vessel 46.8 parts of 6-naphthylamine-2-sulfonic acid (Broenner's Acid) were diazotized as in Example 1, then separated into 2 equal parts. The J acid urea slurry was heated to 45° C. and to it was gradually added one half of the diazotized Broenner's Acid, maintaining the temperature of the coupling reaction at about 45° C. and the pH at 4.0 to 5.0 by the gradual addition of triethanolamine. About 11.0 parts of triethanolamine were required. When this coupling was complete, the pH of the mixture was raised to 8.0 by adding 34.0 parts of triethanolamine. Then, with the temperature maintained at 45° C., the other half of the diazotized Broenner's Acid was gradually added, the pH being maintained at 7.5 to 8.0 by adding triethanolamine, 250 parts being required. The resulting reaction mass was a dark red solution having an active ingredient content of 15.5% as measured spectrophotometrically against a known standard. It was completely miscible with water and dyed paper by conventional methods in a bright scarlet shade. The solution maintained its dyeing strength and showed no precipitate after storage at 0° C. to 50° C. for six months.

In the above preparation the sodium acetate buffer can be replaced, without affecting the results, by either 10 parts of 2.5 N lithium acetate solution, 3.0 parts of glacial acetic acid or the product obtained by mixing 4.73 parts of triethanolamine with 1.50 parts of glacial acetic acid in 10 parts of water.

The structure of this dye is the same as that shown for the dye of Example 1.

EXAMPLE 3

In a first vessel 16.7 parts of 6-naphthylamine-2-sulfonic acid (Broenner's Acid) and 29.1 parts of 5-naphthylamine-1-sulfonic acid (Laurent's Acid) were added to 120 parts of water and 11.7 parts of hydrochloric acid and the mixture was stirred to a smooth slurry. Next, 14.5 parts of sodium nitrite were added and the mixture was stirred for 3 hours to complete the diazotization, the temperature being maintained at near 15° C. by external cooling. This diazo slurry was added to a slurry of 50.4 parts of J acid urea, 100 parts of water and 51.0 parts of triethanolamine, prepared as in Example 1. During the gradual addition the coupling mixture was maintained at 45° C. The resulting reaction mass was a dark red solution having an active ingredient content of 16% as measured spectrophotometrically against a known standard. When used to dye paper by conventional methods bluish-red shades resulted.

The dye is a mixture containing

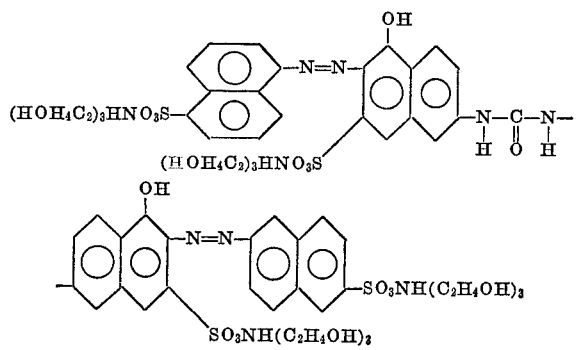

and small amounts of

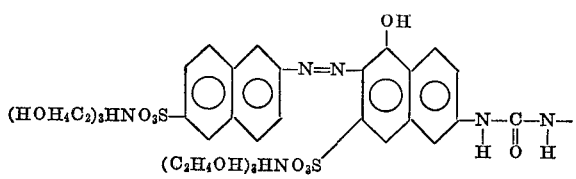

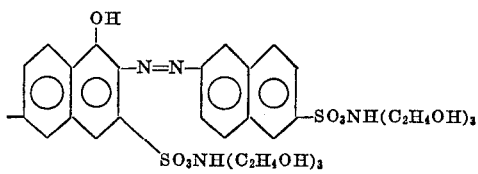

and

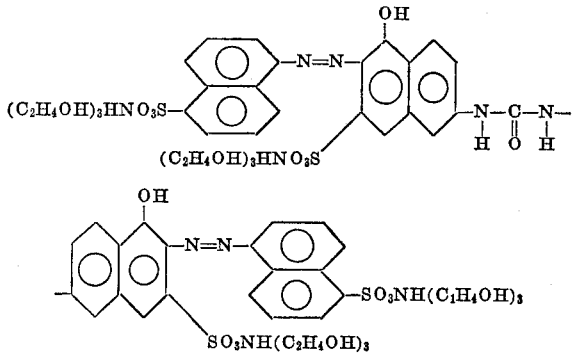

some of the sulfonic acid groups are in the form of sodium salts.

A similarly satisfactory dye solution was obtained by coupling a diazotized mixture from 16.7 parts of 6-naphthylamine-2-sulfonic acid and 29.1 parts of 4-naphthylamine-1-sulfonic acid (naphthionic acid) and 50.4 parts of J-acid urea by the same procedure.

The dye is a mixture of

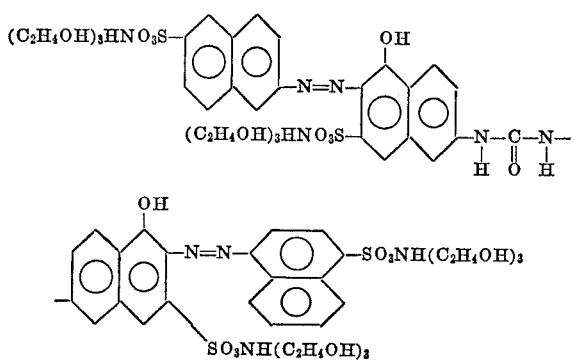

and

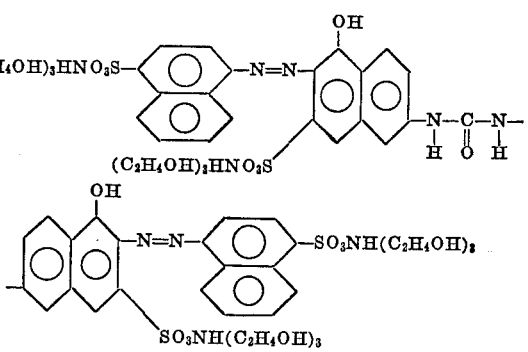

with a minor amount of

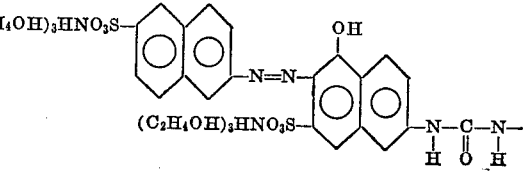

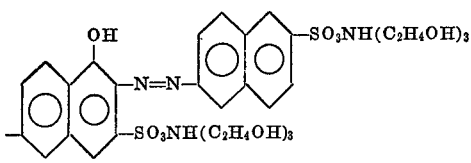

some of the sulfonic acid groups are in the form of sodium salts.

EXAMPLE 4

In a first vessel 39.4 parts of 2-aminotoluene-5-sulfonic acid and 11.4 parts of hydrochloric acid were added to 200 parts of water, with agitation. To this slurry were gradually added 14.5 parts of sodium nitrite, the mixture being stirred at 18 to 20° C. for 1 hour to complete the diazotization. In a second vessel 50.4 parts of J acid urea (as water wet presscake) and 33.6 parts of triethanolamine were added to 100 parts of water and the mixture was stirred to a smooth uniform slurry. Then another 36.4 parts of triethanolamine were added to the J acid urea slurry and the charge was heated to 60–65° C. to effect solution. The solution was cooled to 45° C. and the previously prepared diazo slurry was added gradually over 25 minutes while maintaining the coupling reaction temperature at about 45° C. The final pH was 8.3. The reaction mass was a dark orange colored solution having an active ingredient content of 24% as determined spectrophotometrically against a known standard. It was completely miscible with water and dyed paper by conventional methods in bright reddish orange shades.

The dye is predominantly

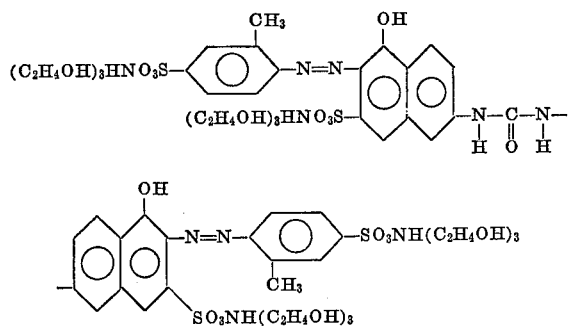

although some of the sulfonic acid groups are in the form of sodium salts.

EXAMPLE 5

In a first vessel 19.7 parts of 2-aminotoluene-5-sulfonic acid, 14.4 parts of p-aminobenzoic acid and 9.51 parts of hydrochloric acid were added to 120 parts of water, with agitation. To this slurry 14.5 parts of sodium nitrite were added gradually at 10 to 13° C. and the charge was stirred for one hour at this temperature to complete the diazotization. The diazo slurry was coupled to 50.4 parts of J acid urea by the same procedure described in Example 4. The resulting reaction mass was a dark orange colored solution with a pH of 7.5 and having an active ingredient content of 14.7% as determined spectrophotometrically against a known standard. The solution was similar in physical properties to the product obtained in Example 4. It was used to dye paper by conventional methods in bright reddish orange shades.

The dye is a mixture of

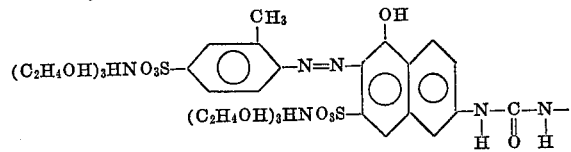

where some of the sulfonic and carboxylic acid groups are in the form of sodium salts.

EXAMPLE 6

The diazonium salt of 2-aminotoluene-5-sulfonic acid was prepared by adding 19.7 parts of that amine and 4.56 parts of hydrochloric acid to 60 parts of water with agitation, then adding 7.25 parts of sodium nitrite at 18 to 20° C., using external cooling. In another vessel the diazonium salt of p-aminobenzoic acid was prepared by adding 14.4 parts of the amine and 5.65 parts of hydrochloric acid to 60 parts of water, with agitation, then adding 7.25 parts of sodium nitrite, maintaining the temperature at 10 to 13° C.

In a third vessel 50.4 parts of J acid urea were added to 75 parts of water containing 4.1 parts of sodium acetate and the mixture was stirred to a uniform slurry. The J acid urea slurry was heated to 45° C. and to it was then added gradually the diazonium salt mixture from 2-aminotoluene-5-sulfonic acid, maintaining pH at 4.0–5.0 by simultaneous addition of triethanolamine. When this coupling was complete, the pH of the mixture was raised to 7.5 by adding 25 parts of triethanolamine. Then the diazonium salt mixture from p-aminobenzoic acid was added gradually, maintaining the pH in the coupling mixture at 7.5–7.7 by adding triethanolamine as necessary. Coupling temperature throughout was held at about 45° C.

The product of this example dyed paper in bright reddish orange shades. The dye is of the same structures shown for the product of Example 5.

EXAMPLE 7

The dye solution of the constitution shown for the products of Example 5 and Example 6 was also prepared in the following manner.

A slurry was prepared by adding 50.4 parts of J acid urea and 4.1 parts of sodium acetate to 75 parts of water, with agitation. Temperature of the slurry was adjusted to 45° C. and to it at pH 4.0–5.0 was gradually added one half of the mixed diazonium salts of 2-aminotoluene-5-sulfonic acid and p-aminobenzoic acid as prepared in Example 5. The pH was maintained by adding triethanolamine as needed. When this coupling was complete, the pH of the coupling mixture was raised to 7.8 by addition of 23.5 parts of triethanolamine. Then the other half of the diazo slurry was added, maintaining pH at 7.5–8.0 by known standard. The product solution dyed paper in bright orange shades but was stable for only several days. After 72 hours a precipitate formed to give a thick paste.

This dye is predominantly

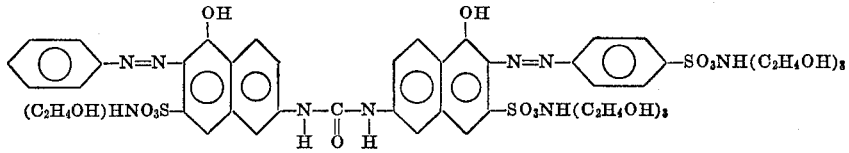

the gradual simultaneous addition of triethanolamine, the temperature being maintained at 45° C. until coupling was complete. The sodium acetate buffer can be replaced, without affecting the results, with 3.4 parts of sodium formate and the pH of the first coupling then held at 3.0–4.0 instead of 4.0–5.0.

The dye solution product was stable for six months, showing no precipitate when held at 0° C. to 50° C. for that period. It was used to dye paper by conventional methods in bright reddish orange shades. The constitution is the same as shown for Example 5.

Examples 5, 6 and 7 show the preparation of dye solutions from the same starting materials in three different coupling variations. All three coupling procedures gave satisfactory dye solutions, using triethanolamine as acid acceptor and salt former, as prescribed by the process of the invention. The differences in properties of these three solutions are slight, mainly in the shade of dyeing. The variations shown are commonly used in attempting to achieve desired shades.

EXAMPLE 8

The following example illustrates a limiting case where only one of the two amines diazotized and coupled to J acid urea contains a sulfonic or carboxylic acid group. The product is a solution initially but begins to show a precipitate after only about 72 hours.

In a first vessel 18.4 parts of sulfanilic acid and 13.1 parts of hydrochloric acid were added to 250 parts of water, with agitation. To this slurry were gradually added 7.2 parts of sodium nitrite and the mixture was stirred for one hour at 20° C. to complete the diazotization. The slurry was cooled to 0° C. using external cooling and 9.85 parts of aniline were added, followed by 7.3 parts of sodium nitrite, the temperature being maintained at 0° to 2° C. After stirring 30 minutes to complete the diazotization the diazo mixture was added to a slurry prepared by adding 50.4 parts of J acid urea and 33.6 parts of triethanolamine to 100 parts of water, with subsequent addition of another 36.4 parts of triethanolamine, the temperature being adjusted to 45° C. After adding the diazo mixture to the J acid urea slurry the reaction mass was a syrupy liquid of pH 8.3 containing 12% active ingredient as determined spectrophotometrically against a although some of the two symmetrical disazo compounds are also present.

The embodiments of the invention in which an exclusive property or privilege is claimed are defined as follows:

1. Process for preparing storage stable, 10–25 weight percent, aqueous solution of J acid urea dye consisting of a major amount of the triethanolammonium salt of dye having the formula

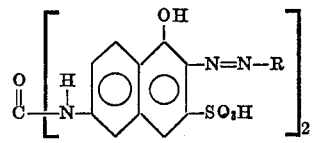

wherein each R is phenyl or naphthyl, with the proviso that at least one R group is substituted and at least one such substituent is sulfo or carboxy, which process consists of coupling the diazonium salt of the appropriate amine and J acid urea, at a molar ratio of about 2:1, in an aqueous medium, at a pH of about 3–9, at a temperature of about 0–65° C., in the presence of sufficient triethanolamine to neutralize the acid liberated during the coupling reaction and to provide the major amount of triethanolammonium salt of the dye having said formula.

2. The process of claim 1 wherein the appropriate amine is selected from Broenner's Acid, Laurent's Acid, naphthionic acid, 2-aminotoluene-5-sulfonic acid and p-aminobenzoic acid.

3. The aqueous reaction mixture resulting from the process of claim 1.

References Cited

UNITED STATES PATENTS

| | | | |
|---|---|---|---|
| 2,314,356 | 3/1943 | Lee et al. | 260—371 |
| 2,602,788 | 7/1952 | Anderau | 260—166 |
| 2,746,955 | 5/1956 | Armento | 260—175 |

FOREIGN PATENTS

| | | | |
|---|---|---|---|
| 122,904 | 11/1899 | Germany | 260—175 |

JOSEPH REBOLD, Primary Examiner

D. M. PAPUGA, Assistant Examiner